(12) United States Patent
Hwang (10) Patent No.: US 12,078,318 B1
(45) Date of Patent: Sep. 3, 2024

(54) SOLAR LIGHTING MODULE FOR GARDEN LAMPS

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 18/385,048

(22) Filed: Oct. 30, 2023

(51) Int. Cl.
| | |
|---|---|
| *F21S 9/03* | (2006.01) |
| *F21V 17/14* | (2006.01) |
| *F21V 17/16* | (2006.01) |
| *F21V 21/08* | (2006.01) |
| *F21V 23/00* | (2015.01) |
| *F21V 31/00* | (2006.01) |
| *F21W 131/109* | (2006.01) |

(52) U.S. Cl.
CPC ............. *F21S 9/037* (2013.01); *F21V 17/14* (2013.01); *F21V 17/164* (2013.01); *F21V 21/0824* (2013.01); *F21V 23/009* (2013.01); *F21V 31/005* (2013.01); *F21W 2131/109* (2013.01)

(58) Field of Classification Search
CPC .......... F21S 9/037; F21S 9/03; F21V 23/009; F21V 21/0824; F21W 2131/109
See application file for complete search history.

(56) References Cited

U.S. PATENT DOCUMENTS

| | | | | |
|---|---|---|---|---|
| 5,367,442 | A * | 11/1994 | Frost | F21S 9/037 362/183 |
| 9,420,661 | B2 * | 8/2016 | Martzall | F21V 31/005 |
| 11,002,418 | B1 * | 5/2021 | Hollinger | F21S 8/081 |
| 2012/0188752 | A1 * | 7/2012 | Chen | F21V 23/009 362/183 |

\* cited by examiner

*Primary Examiner* — William N Harris
(74) *Attorney, Agent, or Firm* — BACON & THOMAS, PLLC (57) ABSTRACT

A solar lighting module for garden lamps detachably mounted onto the top end of a hollow lamp column of a garden lamp includes a top with an upper casing of a solar panel, at least one light emitting element and an integrated circuit board (PCBA) of a battery fixed in the upper casing, and a multiple of conductive springs installed on the integrated circuit board and passed upwardly through the top of the upper casing and a conductive terminal of the solar panel for an electrical connection to achieve the effect of quick assembly.

10 Claims, 7 Drawing Sheets

SOLAR LIGHTING MODULE FOR GARDEN LAMPS

TECHNICAL FIELD OF THE DISCLOSURE

The present disclosure relates to a solar lighting module for garden lamps, and more particularly to a garden lamp with a solar self-supply capability, in which a solar panel for generating electric power and an integrated circuit board of the garden lamp can be electrically connected to each other easily, quickly and conveniently.

DESCRIPTION OF RELATED ART

Most structures of the related-art garden lamps come with a sharp ground plug at the bottom of the lamp, so that the lamp can be plugged using the ground plug into soil and erected in a garden to emit light. In addition, a more advanced related-art garden lamp has the self-generation capacity of electric power by installing a solar panel at the top of the lamp, such that the solar panel can generate electric power on its own and supply the electric power to an integrated circuit board (PCBA) in the lamp in order to drive the lamp to emit light and charge a battery in the lamp.

The aforementioned integrated circuit board and solar panel are electrically connected to each other by a plurality of electrical wires. At present, manual soldering is used in production lines for connecting these electrical wires. Specifically, the operators in the production lines need to manually solder the electrical wires between the solar panel, integrated circuit board and battery one by one. However, the manual soldering is relatively inconvenient, time-consuming and labor intensive, thus resulting in high manufacturing costs.

In view of the above drawbacks, the present discloser based on years of experience to conduct extensive research and experiment, and finally provided a solar lighting module for garden lamps to improve the drawbacks of the related art.

SUMMARY OF THE DISCLOSURE

The objective of the present disclosure is to provide a solar lighting module for garden lamps, in which a solar panel for generating electric power and an integrated circuit board of a garden lamp can be electrically connected to each other easily, quickly, and conveniently, so as to achieve the effects of lowering the level of difficulty of assembly, saving processing time, reducing production cost, and improving the production efficiency of the garden lamp.

To achieve the aforementioned objective, the present disclosure provides a solar lighting module for garden lamps, detachably mounted onto a top end of a hollow lamp column of a garden lamp, and the solar lighting module includes an upper casing detachably mounted onto the hollow lamp column, a top plate disposed on the top of the upper casing and having a front side for installing a solar panel and a back side opposite to the front side; a bottom plate combined with the bottom of the upper casing, an integrated circuit board (PCBA) fixed between the upper casing and the bottom plate, and at least one light emitting element and a battery installed on the integrated circuit board, characterized in that: the solar panel has a bottom side stacked and fixed to the front side of the top plate, the bottom side has a plurality of conductive terminals, the top plate at the top of the upper casing is formed with a perforation configured to be corresponsive to each conductive terminal, and the integrated circuit board is provided with a conductive spring opposite to each perforation, and after each conductive spring upwardly passes through the corresponding perforation, the conductive spring elastically abuts the conductive terminal of the bottom side of the solar panel, such that the integrated circuit board and the solar panel are electrically connected to each other; and the light emitted from the light emitting element can be passed through the bottom plate and projected into the hollow lamp column, and then transmitted to the outside through the hollow lamp column.

In this way, the solar panel can supply electricity to the integrated circuit board through the conductive springs, so that the integrated circuit board activates the light emitting element to emit light. The solar panel also can supply electricity to the battery through the conductive spring to charge the battery, so that when the solar panel stops generating electric power, the battery can supply electricity to the integrated circuit board to drive the light emitting element to emit light.

Compared with the related art, the structural design of the conductive springs electrically connected to the solar panel and the integrated circuit board by the elastic abutment enables the solar panel and the integrated circuit board to be electrically connected easily, quickly and conveniently without requiring the manual wire soldering, thus this disclosure has the advantages of saving manpower, material resources and processing time, as well as improving production efficiency.

The technical characteristics of this disclosure will become apparent with the detailed description of preferred embodiments accompanied with the illustration of related drawings as follows.

DETAILED DESCRIPTION OF THE DISCLOSURE

With reference to FIGS. 1 to 4 for a solar lighting module for garden lamps in accordance with a preferred embodiment of the present disclosure, the solar lighting module 100 can be detachably mounted to the top end of a hollow lamp column 1 of a garden lamp, and the solar lighting module 100 includes an upper casing 2 having a top plate 20 at the top of the upper casing 2, and a front side 201 of the top plate 20 is provided for installing a solar panel 3; a bottom plate 7 combined with the bottom of the upper casing 2, an integrated circuit board (PCBA) 4 is fixed between the upper casing 2 and the bottom plate 7, and at least one light emitting element 5 and a battery 6 are installed on the integrated circuit board 4. In an embodiment, the light emitting element 5 is an LED lamp.

The bottom of the hollow lamp column 1 is detachably combined with a ground plug 8, the ground plug 8 has a positioning base 81 and a spike 82 extended downwardly from the bottom of the positioning base 81, and the positioning base 81 of the ground plug 8 is combined with the bottom of the hollow lamp column 1 in a tight-fitting manner, such that the spike 82 of the ground plug 8 is arranged under the hollow lamp column 1 and pluggable into the soil to erect the upper casing 2 and the hollow lamp column 1.

In a preferred embodiment of the present disclosure, the solar panel 3 has a bottom side 301 is stacked and fixed to the front side 201 of the top plate 20 of the upper casing 2, the bottom side 301 of the solar panel 3 is provided with a plurality of conductive terminals 31, the top plate 20 of the upper casing 2 has a perforation 21 configured to be corresponsive to each conductive terminal 31 of the solar panel 3, and the integrated circuit board 4 has a conductive spring 41 configured to be opposite to each perforation 21.

Two sides of the integrated circuit board 4 are provided with a conductive plate 42 for fixing and conducting two terminals of the battery 6 respectively, and the battery 6 can be installed between the conductive plates 42, so that the integrated circuit board 4 is electrically connected to the battery 6 through the conductive plate 42.

Figure 2:
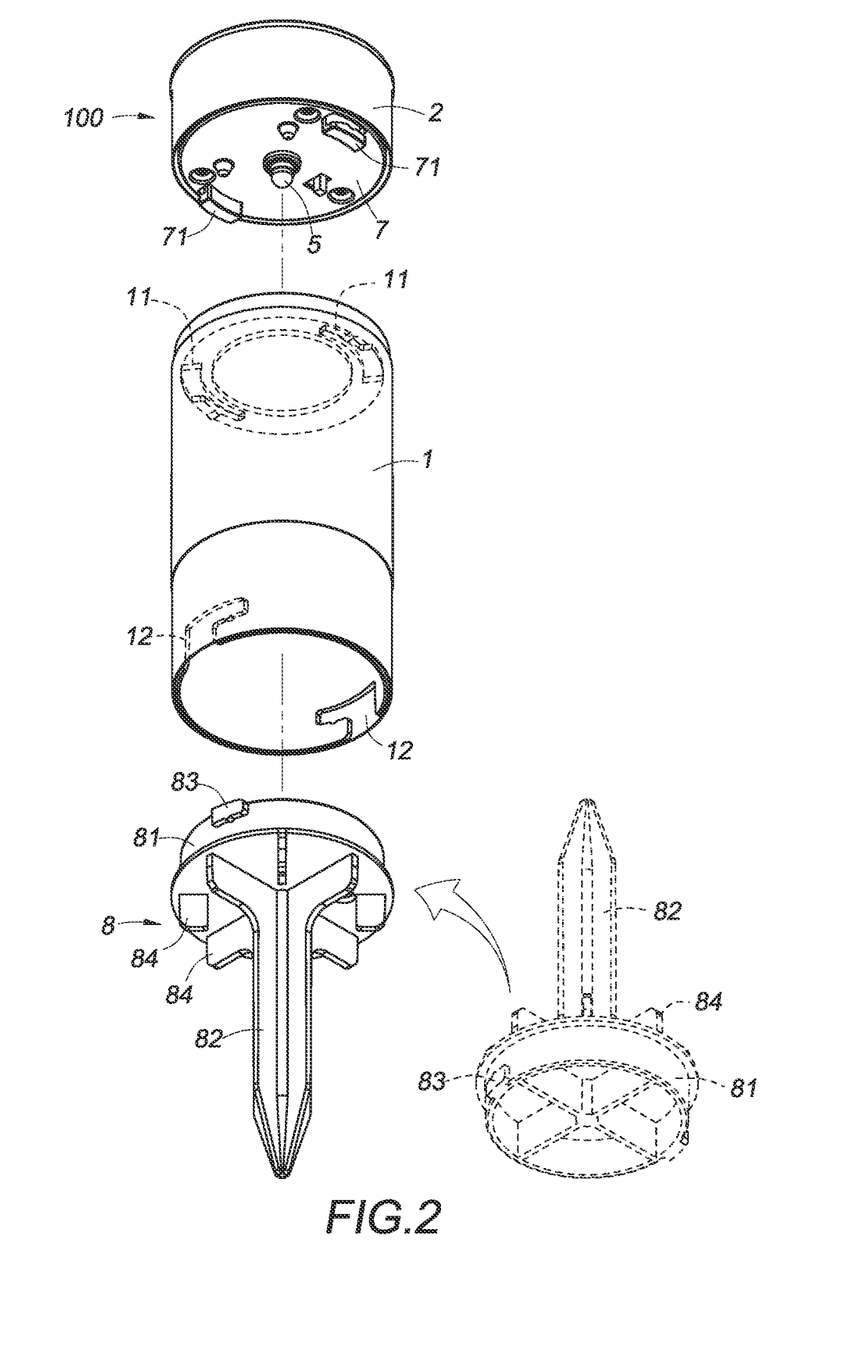
FIG. 2 is an exploded view of the present disclosure.
Figure 3:
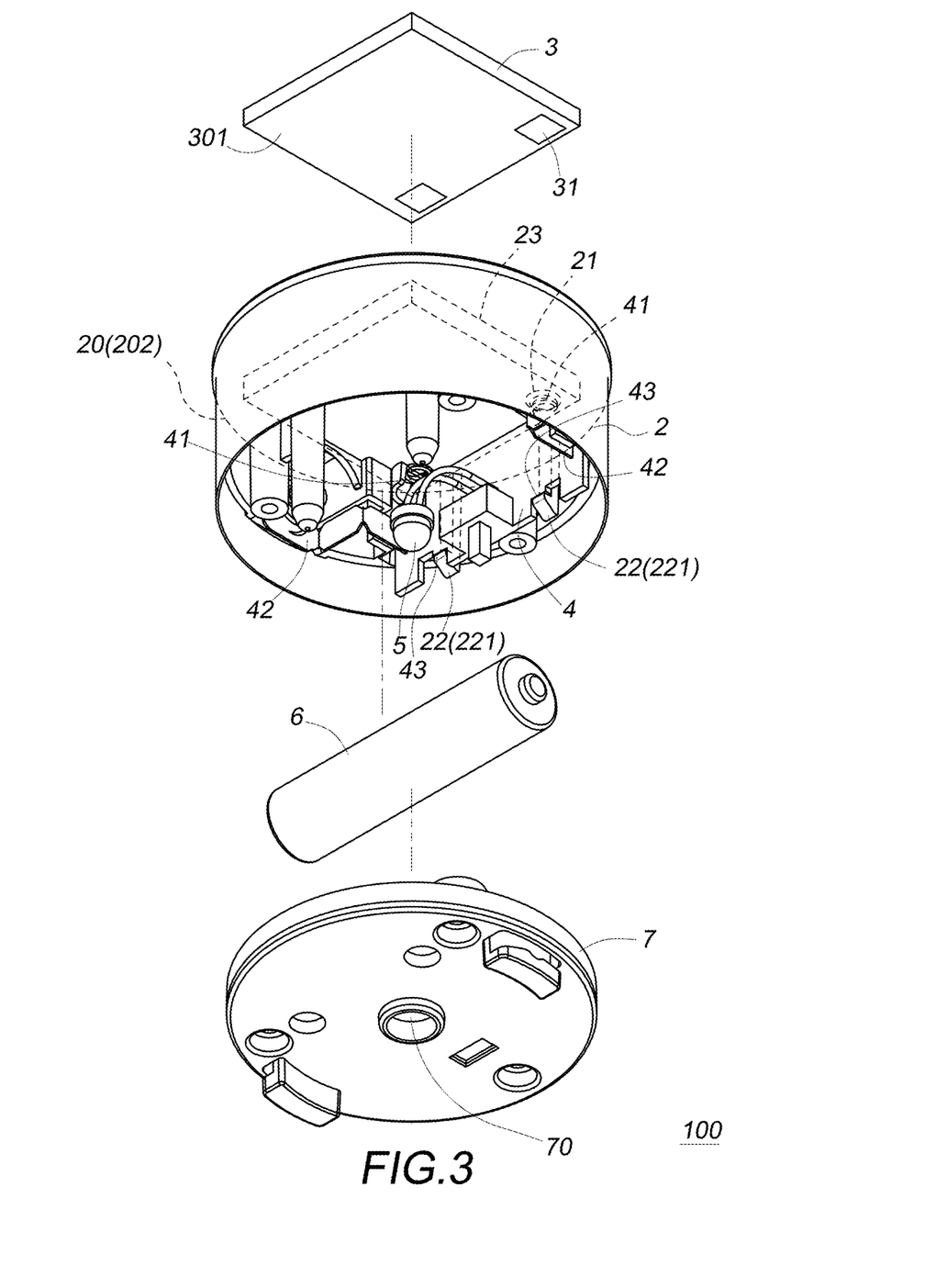
FIG. 3 is an exploded view of a solar lighting module of the present disclosure.
Figure 4:
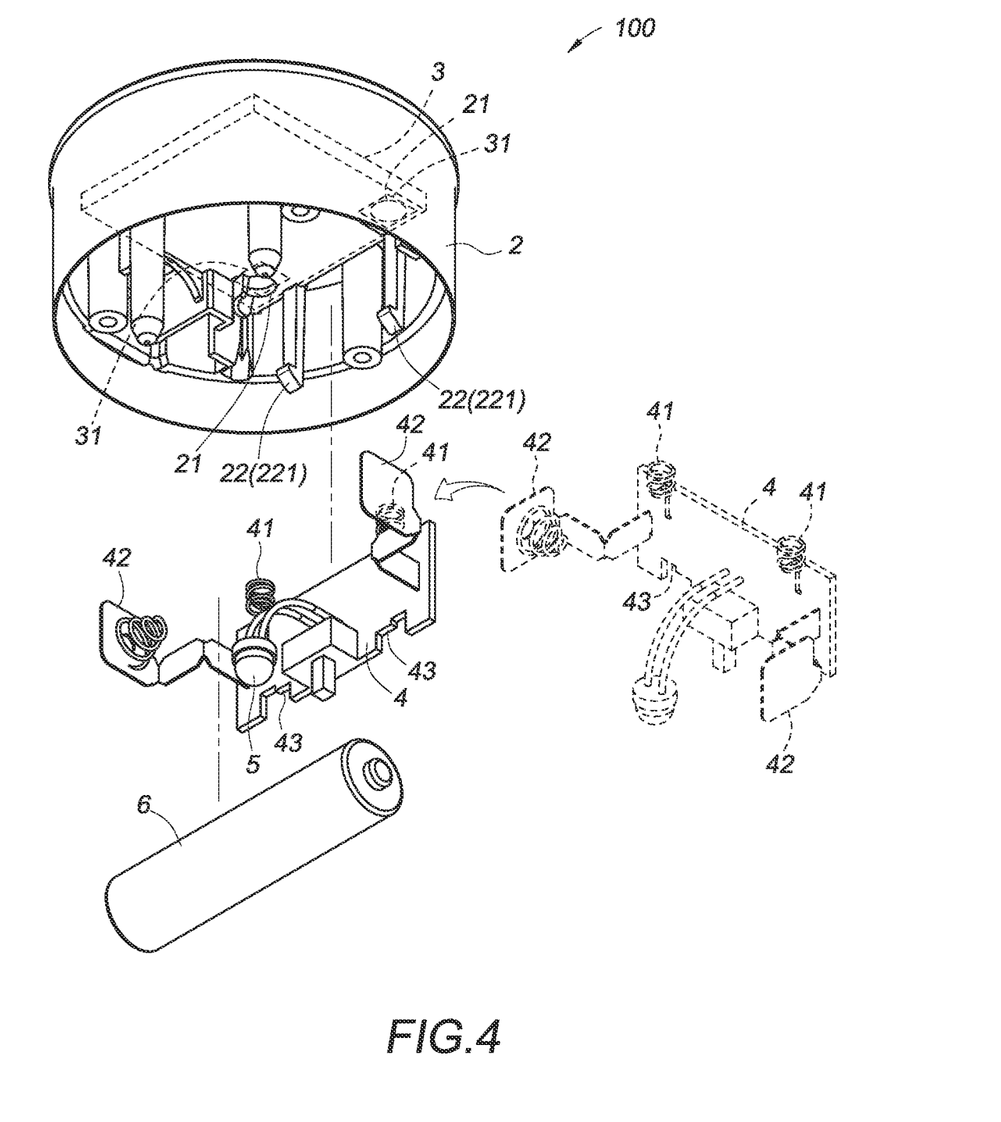
FIG. 4 is another exploded of the solar lighting module of the present disclosure.

In FIGS. 2 to 4, in the assembly of the solar lighting module 100, the conductive spring 41 of the integrated circuit board 4 is passed through the perforation 21, such that after the conductive spring 41 passes through the perforation 21, the conductive spring 41 elastically abuts the conductive terminal 31 at the bottom side 301 of the solar panel 3 to electrically connect the integrated circuit board 4 to the solar panel 3 through the conductive spring 41.

In this way, when the solar panel 3 generates power, electricity can be supplied to the integrated circuit board 4 through the conductive spring 41 to let the integrated circuit board 4 activate the light emitting element 5 to emit light, and the light emitted by the light emitting element 5 can be passed downwardly through the bottom plate 7 and projected into the hollow lamp column 1, and then transmitted to the outside through the hollow lamp column 1. In addition, the solar panel 3 also can supply electricity to the battery 6 through the conductive spring 41 to charge the battery 6. When the solar panel 3 stops generating power, the battery 6 can supply electricity to the integrated circuit board 4 to drive the light emitting element 5 to continue emitting light.

It is understandable that the structural design that electrically connects the solar panel 3 with the integrated circuit board 4 by the conductive spring 41 in the elastic abutment manner can electrically connect the solar panel 3 and the integrated circuit board 4 easily, quickly and conveniently, with the advantages of saving manpower, material resources and processing time as well as improving production efficiency.

In FIGS. 3 and 4, at least one snap part 22 for fixing the integrated circuit board 4 is installed between the top plate 20 of the upper casing 2 and the bottom plate 7. Specifically, the snap part 22 includes a hook 221 extended downwardly from the back side 202 of the top plate 20 of the upper casing 2; the integrated circuit board 4 has a slot 43, the hook 221 of the upper casing 2 can be snapped into the slot 43 of the integrated circuit board 4, such that the integrated circuit board 4 is snapped and positioned between the back side 202 of the top plate 20 of the upper casing 2 and the hook 221 to abuts the conductive spring 41 against the conductive terminal 31 of the solar panel 3 more securely. Therefore, the conductive spring 41 and the upper casing 2 are snapped and fixed to each other by the hook 221 and the slot 43 to improve the convenience of assembly and prevent the integrated circuit board 4 between the upper casing 2 and the bottom plate 7 from falling out.

In FIGS. 2 to 4, the bottom plate 7 is a translucent bottom plate, or the bottom plate 7 has a plurality of translucent holes 70 provided for the light emitting element 5 to be passed to the outside into the hollow lamp column 1, so that the light emitted by the light emitting element 5 can be passed through the translucent bottom plate and/or the translucent hole 70 and projected downwardly into the hollow lamp column 1.

Figure 1:
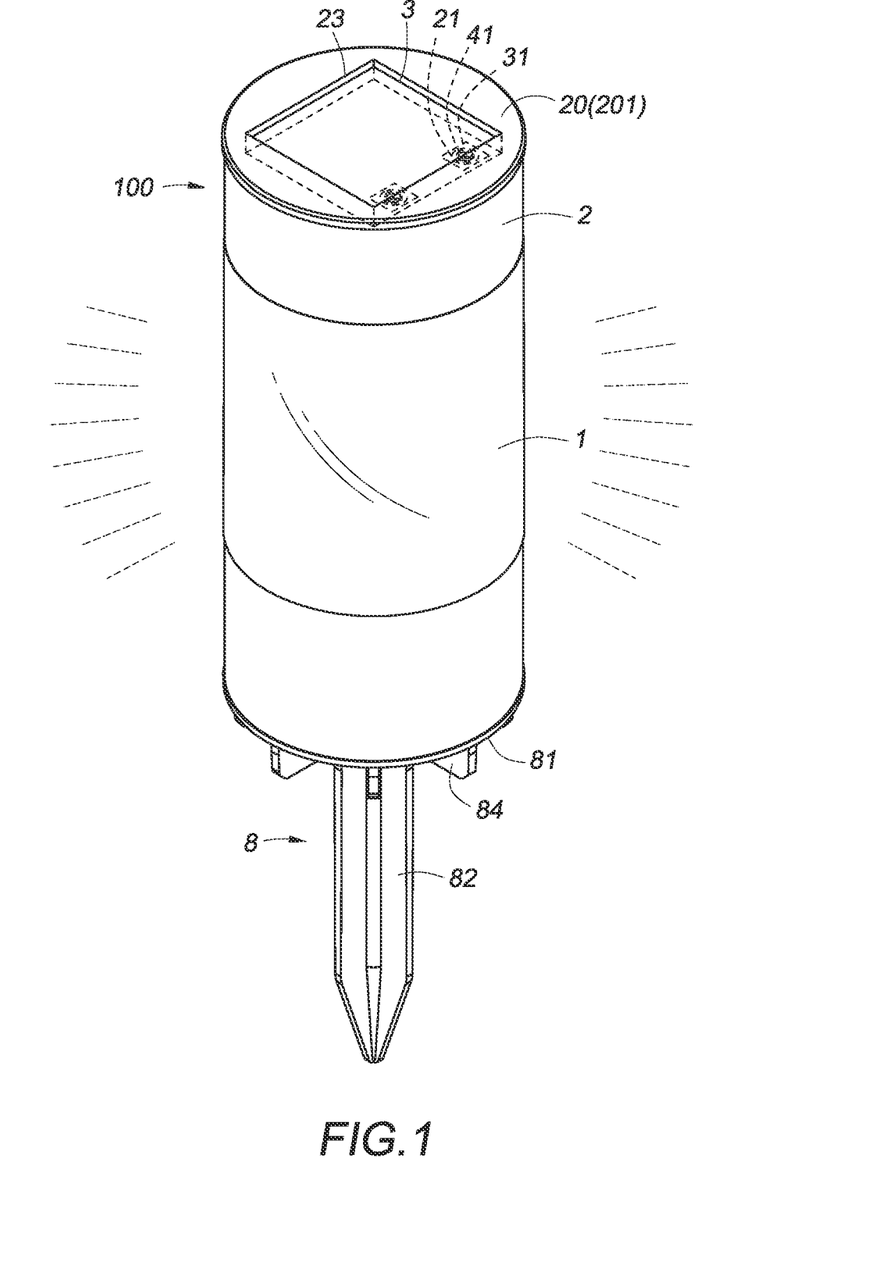
FIG. 1 is a perspective view of a preferred embodiment of the present disclosure.

In FIG. 2, the top end of the hollow lamp column 1 is formed with a plurality of buckle notches 11 spaced from one another, the bottom of the bottom plate 7 is provided with a plurality of buckle part 71 spaced from one another and embeddable into the buckle notches 11 respectively, so that the buckle parts 71 can be rotated and snapped into the buckle notches 11 at the top end of the hollow lamp column 1 to install/remove the solar lighting module 100 to/from the hollow lamp column 1 easily and quickly In FIGS. 1 and 3, the front side 201 of the top plate 20 of the upper casing 2 is formed with a groove 23 for accommodating the solar panel 3, and a waterproof glue is filled between the periphery of the solar panel 3 and the groove 23 and used as a waterproof structure to prevent water from entering into the upper casing 2.

In FIGS. 1 and 2, the bottom of the hollow lamp column 1 also has a plurality of ditches 12 spaced from one another, and the ditches 12 are extended vertically upward and then horizontally to form an L-shaped ditch structure, the top of the positioning base 81 of the ground plug 8 has a plurality of bumps 83 spaced from one another and embeddable into the ditches 12 respectively, so that after the bumps 83 of the ground plug 8 are vertically inserted into the ditches 12 at the bottom of the hollow lamp column 1, and the bumps are horizontally rotated and snapped into the ditches 12 to install/remove the ground plug 8 to/from the hollow lamp column 1 easily and quickly.

Figure 5:
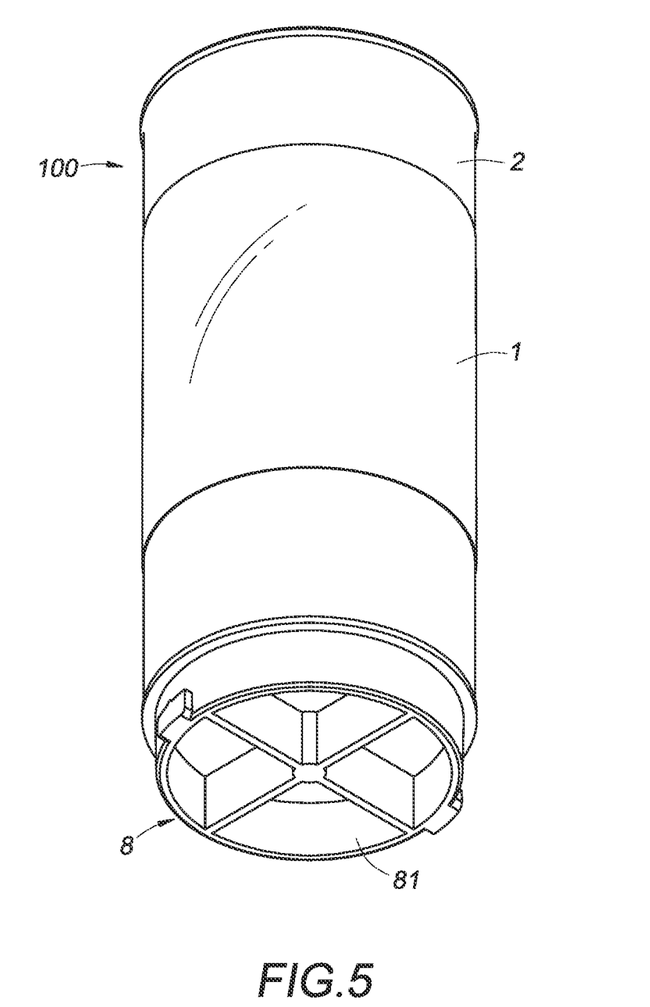
FIG. 5 is a perspective view of another using mode of the present disclosure.

In FIGS. 2 and 5, the positioning base 81 of the ground plug 8 can be combined with the bottom of the hollow lamp column 1 in an inverted L-shaped manner, so that the spike 82 of the ground plug 8 is accommodated in the hollow lamp column 1. In addition, the periphery of the positioning base 81 of the ground plug 8 is provided with a plurality of lugs 84 spaced from one another and abutted against the inner wall of the hollow lamp column 1, so that the ground plug 8 positioning base 81 and the inner wall of the hollow lamp column 1 can be combined and fixed with each other in a tight-fitting manner.

Figure 6:
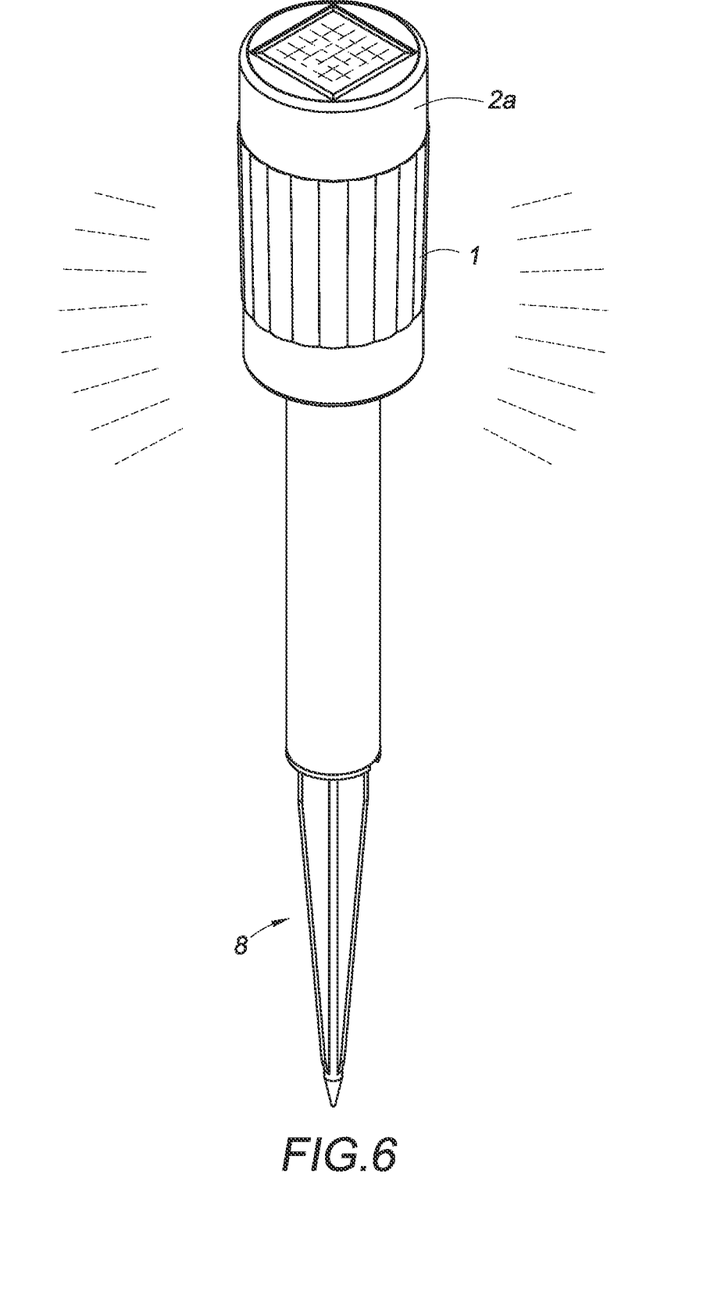
FIG. 6 is a perspective view of another implementation mode of the present disclosure.
Figure 7:
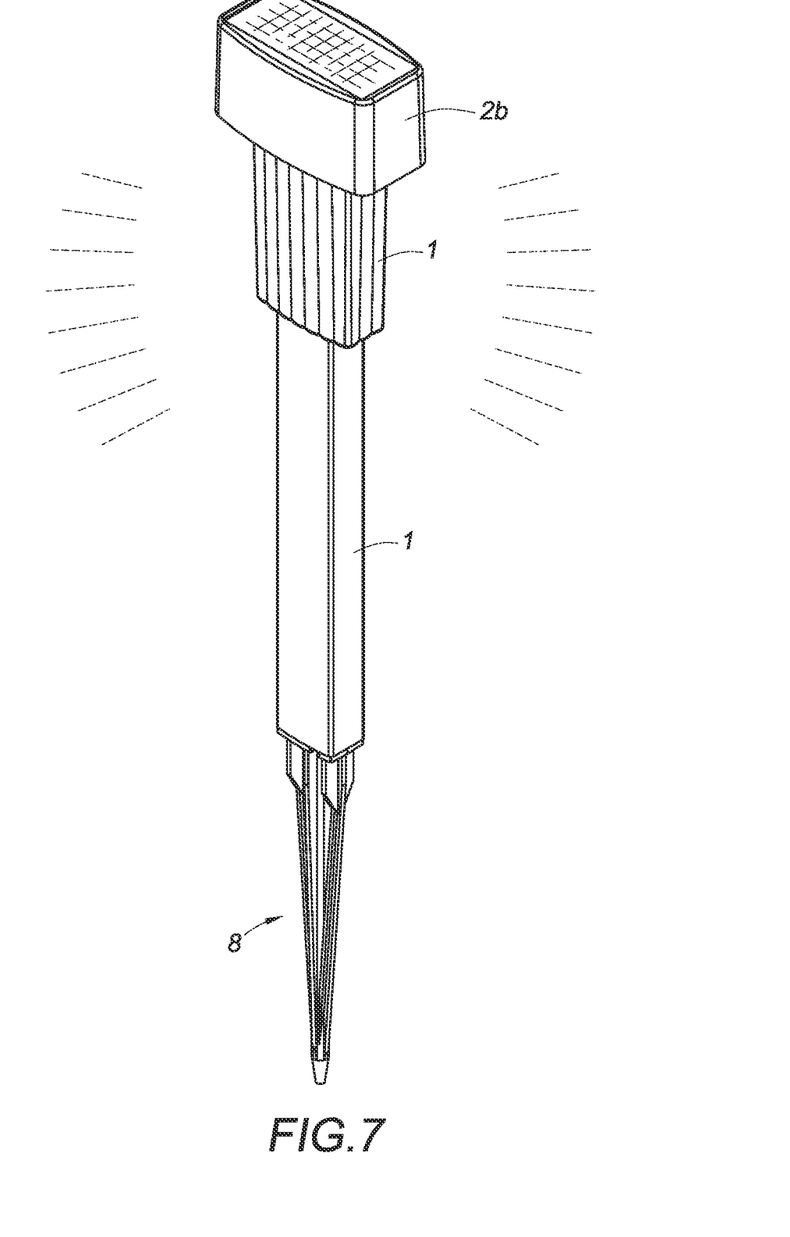
FIG. 7 is a perspective view of a further implementation mode of the present disclosure.

In FIGS. 6 and 7, the upper casing 2a, 2b can be in the form of a cylinder or a polygonal column.

While the disclosure has been described by means of specific embodiments which are provided for illustrating the present disclosure only, but not intended for limiting the scope of the disclosure, and thus numerous modifications and variations with the same or similar objectives, structures, devices, and technical characteristics could be made thereto by those skilled in the art without departing from the scope and spirit of the disclosure as set forth in the claims.

What is claimed is:

1. A solar lighting module for garden lamps, detachably mounted onto a top end of a hollow lamp column of a garden lamp, comprising an upper casing detachably mounted onto the hollow lamp column, a top plate disposed on a top of the upper casing and having a front side for installing a solar panel and a back side opposite to the front side; a bottom plate combined with a bottom of the upper casing, an integrated circuit board (PCBA) fixed between the upper casing and the bottom plate, and at least one light emitting element and a battery installed on the integrated circuit board, characterized in that the solar panel has a bottom side stacked and fixed to the front side of the top plate, the bottom side of the solar panel has a plurality of conductive terminals, the top plate at the top of the upper casing is formed with a perforation configured to be corresponsive to each conductive terminal, and the integrated circuit board is provided with a conductive spring opposite to each perforation, and after each conductive spring upwardly passes through the corresponding perforation, the conductive spring elastically abuts the conductive terminal of the bottom side of the solar panel, such that the integrated circuit board and the solar panel are electrically coupled to each other; and light emitted from the light emitting element can be passed through the bottom plate and projected into the hollow lamp column, and then transmitted outside through the hollow lamp column.

2. The solar lighting module for garden lamps according to claim 1, wherein the upper casing comprises at least one snap part disposed between the top plate and the bottom plate and fixed to the integrated circuit board.

3. The solar lighting module for garden lamps according to claim 2, wherein the snap part comprises a hook extended downwardly from the back side of the top plate of the upper casing, and the integrated circuit board comprises a slot provided for snapping the hook into the slot, so that the integrated circuit board is held and positioned between the back side of the top plate of the upper casing and the hook.

4. The solar lighting module for garden lamps according to claim 1, wherein the front side of the top plate of the upper casing is formed with a groove for accommodating the solar panel, and a waterproof glue is disposed between the solar panel and the groove.

5. The solar lighting module for garden lamps according to claim 1, wherein the bottom plate is a translucent bottom plate, or the bottom plate has a translucent hole provided for passing the light emitting element downwardly out from the bottom plate into the hollow lamp column.

6. The solar lighting module for garden lamps according to claim 1, wherein the bottom plate of the solar lighting module has a bottom side, and plural sets of buckle notches and buckle parts that can be assembled and disassembled with each other are spaced from one another and disposed between the top end of the hollow lamp column and the bottom side of the bottom plate.

7. The solar lighting module for garden lamps according to claim 1, wherein both sides of the integrated circuit board are provided with a conductive plate provided for fixing and electrically conducting two terminals of the battery.

8. The solar lighting module for garden lamps according to claim 1, wherein the hollow lamp column further has a bottom, and a ground plug detachably installed at the bottom of the hollow lamp column, the ground plug has a positioning base, the positioning base has a bottom, a spike is extended downwardly from the bottom side of the positioning base, and the positioning base positioning base is detachably combined with the bottom of the hollow lamp column, such that the spike is disposed below the bottom of the hollow lamp column, or the positioning base can be combined with the hollow lamp column in an upside down manner, so as to accommodate the spike in the hollow lamp column.

9. The solar lighting module for garden lamps according to claim 8, wherein the bottom of the hollow lamp column is formed with a plurality of ditches spaced from one another, and the ditches are extended upwardly in a vertical direction, and then in a horizontal direction, and the positioning base further comprises a top and a plurality of bumps spaced from each other and disposed at the top of the positioning base, and the plurality of bumps can be vertically inserted into the corresponding ditches respectively and then horizontally rotated and snapped.

10. The solar lighting module for garden lamps according to claim 8, wherein the positioning base comprises a plurality of lugs spaced from one another, disposed around the positioning base, and closely abutted against the inner periphery of the hollow lamp column.

* * * * *